Feb. 2, 1960 — N. COHN — 2,923,832
COMPUTATION OF GENERATION REQUIREMENTS WITH COMPENSATION
FOR POWER INTERCHANGES ASSOCIATED
WITH STORED ENERGY CHANGES
Filed Oct. 31, 1957

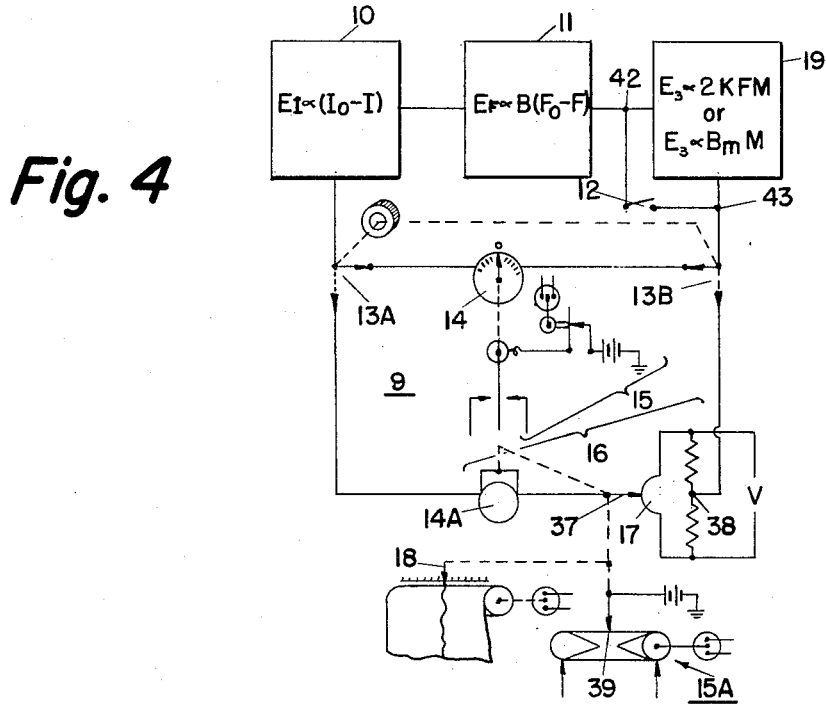
Fig. 4
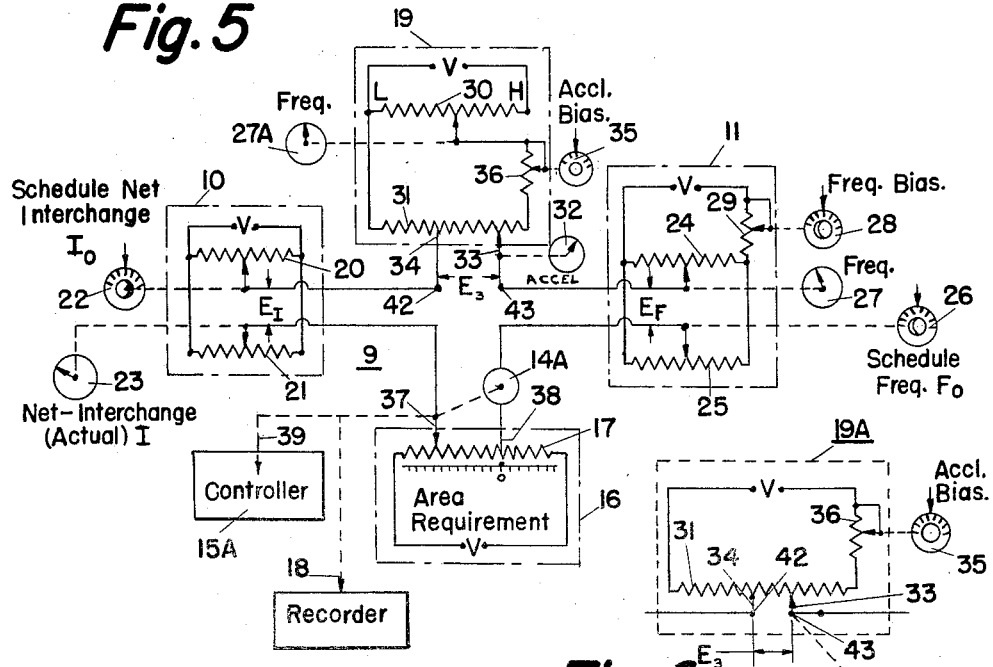
Fig. 5
Fig. 6

United States Patent Office 2,923,832
Patented Feb. 2, 1960

2,923,832

COMPUTATION OF GENERATION REQUIREMENTS WITH COMPENSATION FOR POWER INTERCHANGES ASSOCIATED WITH STORED ENERGY CHANGES

Nathan Cohn, Jenkintown, Pa., assignor to Leeds and Northrup Company, Philadelphia, Pa., a corporation of Pennsylvania Application October 31, 1957, Serial No. 693,589

49 Claims. (Cl. 307—57)

The invention relates to the control of electrical generation within an area having a tieline connection for a scheduled interchange of power with a distribution network including at least one remote generating area.

A principal object of the invention is to provide improved systems for computing generation requirements of an area by introducing compensation for those components of tieline power flow which are associated with changes in stored energy of rotating masses, such as the generator rotors, the rotors of the associated prime movers, the rotors of motors supplied from the power network, and the machinery driven by such motors.

In determining the generation required of an area to meet its schedule, there are involved, in prior computing systems, the scheduled interchange of power, the actual interchange of power, and usually also the frequency for normal interchange (generally 60 cycles), the actual frequency, and the frequency-bias of the area. Inclusion of these last three factors in an area-requirement computing system has the purpose that each area will participate in frequency correction of the interconnected generating areas, will absorb its own load changes, and also will contribute power toward load changes that occur outside of its own area pending ability of the area in which the load change occurred completely to absorb that load change. The extent of such contribution by an area is determined by its assigned frequency-bias. The corresponding frequency-bias setting establishes the relationship between frequency and the deviation of tie-line power flow from the interchange schedule established for normal frequency. This frequency/tie-line relationship is based on steady-state tie-line power flows and recognizes that changes in tie-line power flow, on occurrence of a frequency change due to a load change in a remote area, derive from changes with frequency of effective load within the local area, and/or from governor-inspired generation changes in the local area in response to said changes in frequency.

There occur, however, changes in tie-line power flow which do not derive from either of such causes, but from stored energy changes in rotating masses of the local area. Such changes in the tie-line power flow result in erroneous computations or readings of area requirement, and therefore in improper generation control action initiated by or based upon such computations or readings.

For example, upon sudden increase of load in a remote area, there is supplied to it over the tie-line a transient power flow derived from the spinning or stored energy of a local area. This transient component of the tie-line power flow from the local to the remote area results, when using prior computing systems and methods, in an incorrect area requirement reading for the local area. When such incorrect area requirement readings are utilized for control purposes, they cause improper and unnecessary generation changes of that area.

Also on many occasions, there is a swinging or oscillating power flow between areas; this so-called synchronizing power, like the transient power flow above discussed, is associated with changes in the spinning or stored energy of the areas, the spinning energy of one area decreasing as power flows from it to another area where stored energy is increased. That component of the tieline power flow which is associated with such interchange of stored energy is not related to the respective true generation requirements of the areas, and its existence results—when using prior area-requirement computing circuits—in spurious area-requirement readings. If such computations are used for control purposes, improper and unnecessary generation changes will result in both areas.

In accordance with the present invention, the errors in computation of area requirement resulting from the aforesaid transient or synchronizing components of tieline power flows are compensated by introduction of an effect proportional to the rate of change of the spinning or stored energy of the area. More particularly, for example in an area-requirement computing network in which there is produced a voltage or current varying in accordance with the actual tieline power, there is introduced a compensating or modifying voltage or current which is varied in accordance with the rate of change of stored energy of that area. Thus the computed area requirement, as used to indicate, record or automatically to effect the required generation change within the area, includes a term which compensates for the aforesaid transient and oscillating components of tieline power flows and a true area-requirement computation is obtained. For most complete compensation, the modifying effect should be proportional to the product of frequency times the rate of change of frequency. However, since the percentabe change in frequency is normally much smaller than the percentage change in the rate of change of frequency, the variable frequency factor may often be omitted from the compensation. Such compensating or modifying terms may also be introduced into the computation of station or unit requirements for like purpose.

The invention further resides in systems having features of novelty and utility hereinafter described and claimed.

For a more detailed understanding of the invention, reference is made in the following description to the accompanying drawings, in which:

Fig. 4 is a block diagram schematically illustrating a computing network embodying the invention;

Fig. 5 is a specific embodiment of Fig. 4 showing circuit components of the blocks thereof;

Figure 10:
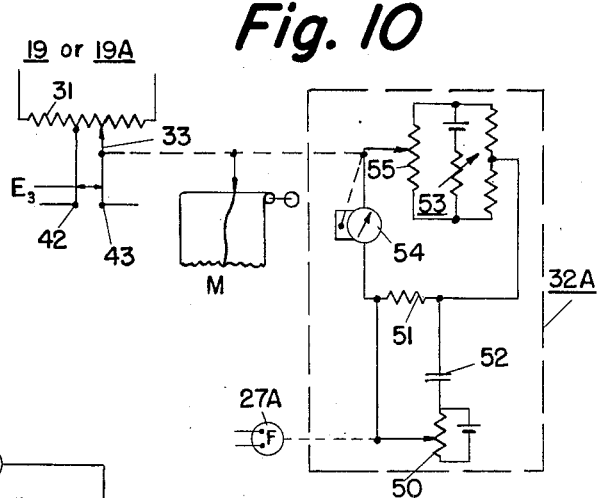

Figs. 6 to 9 schematically illustrate various modifications of the block 19 of Figs. 4 and 5; and Fig. 10 is an arrangement suited for computing acceleration for use in the system of Fig. 5.

For a clear understanding of concepts underlying the invention and of terms used in defining it, there follows a discussion of Figs. 1, 2A–2F, 3A and 3B.

Figure 1:
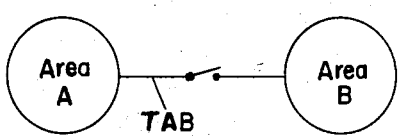
Figs. 1, 2A–2F, 3A and 3B are explanatory figures referred to in discussion of the invention.

Referring to Fig. 1, it is first assumed that the tieline connection TAB between two generating areas A and B is broken so that the areas are isolated. Under this assumption, as the connected load in area A is increased, the frequency falls, whereupon the governors of generating units of that area respond to increase the input and so increase the generation to carry the additional load. In this isolated area, a changing frequency indicates that area generation resulting from concurrent prime mover inputs is not equal to effective area load. A decreasing frequency, reflecting a decelerating system, means that effective load exceeds area generation based on concurrent prime mover inputs. The increase in effective load is temporarily taken care of by an additional increment of power derived from a decrease in stored energy of the spinning masses. The following relation applies:

$$G + P_{SE} = L$$

where:

G is the area generation derived from concurrent prime mover input
$P_{SE}$ is the power derived from change in stored energy
L is the effective area load.

The power derived from decrease in stored energy continues to help satisfy the increased area load until the governing action of the generating sources within the area increases the prime mover inputs sufficiently to arrest the frequency decrease, at which time the area generation concurrently derived from prime mover input is matched to the effective area load.

A decrease in load within isolated area A would result in a positive acceleration of spinning masses of the area. The area generation derived from concurrent prime mover input would exceed the effective area load, and the difference would be added to the stored energy of the area. Conversion of the excess generation into stored energy would continue until governing action, due to the increased frequency, decreases the generation to extent arresting the acceleration, at which time the area generation derived from concurrent prime mover input again matches effective area load.

In brief résumé: when, in an isolated area starting with balance between effective load and generation from concurrent prime mover input, a new load is added, it will be initially accommodated by a transient power flow derived from and at the expense of stored energy of the area, with accompanying deceleration of the rotating masses of the area. The converse is true when load is dropped within the area, the stored energy of the area increasing, with accompanying acceleration of the rotating masses of the area.

It is now assumed that the tieline connection TAB is completed between the generating areas A and B. An objective of such interconnection is to permit exchange of power between the areas with an agreed interchange at normal frequency and with each area varying its generation to match load changes within that area. When such matching is attained after a load change occurs in either area, there is no interchange of power between the areas except that which is provided by the normal-frequency schedule. However, in practice, before such matching is actually accomplished, there is a change in tieline flow between areas upon occurrence of a load change in one of them because of (1) the transient accommodation of the new load from the stored energy in both areas, and (2) the governing action in both areas, which governing action matches total generation of the interconnected areas to their total load regardless of where the load change occurred.

With prior area-requirement computing circuits, there has been provision, by introduction of a frequency-bias, to compensate for the governing action in one area in response to a load change in another area, but there has not been provision to compensate for the aforementioned transient power flow. Such latter compensation is provided by the present invention. Discussion thereof is preceded by a brief review of a computing system lacking such latter compensation.

Assume that area A, under terms of an agreement, is to operate on a frequency-biased power-interchange schedule (exemplified by line FL of Fig. 3A) under which area A delivers over the tieline a scheduled interchange of $I_0$ megawatts to area B at a scheduled normal frequency $F_0$, usually 60 cycles. Under such frequency-biased schedule, area A has zero area requirement whenever the concurrent magnitudes of frequency and tieline interchange define a point that falls on the schedule line FL; area A has a positive area requirement—i.e., a need for increased generation—for all concurrent values of frequency and tieline interchange defining points below line FL; and area A has a negative area requirement—i.e., a need for decreased generation—for all concurrent values of frequency and tieline interchange defining points above the line FL.

Expressed in equations form area requirement as computed in such prior arrangement may be defined as (1)     Area requirement $= (I_0 - I) - B(F_0 - F)$ where:

$I_0$ = scheduled normal interchange (megawatts)
$I$ = actual interchange (megawatts)
$B$ = bias factor (megawatts/cycle) [1]
$F_0$ = normal scheduled frequency (cycles per second)
$F$ = actual frequency (cycles per second)

[1] The bias factor is a minus parameter reflecting the negative stop of line FL.

$I_0$ is the scheduled interchange for normal frequency. Permissible deviations from the normal interchange $I_0$ can be scheduled for deviations $(F_0 - F)$ from normal frequency by presetting the magnitude of B.

To show how the compensation for governing response in a local area to load change in a remote area is achieved in a computation based on Equation 1, let it be assumed that: starting with balanced conditions of scheduled tieline flow of 50 megawatts from local area A to remote area B, and 60-cycle frequency; a bias-setting of 100 megawatts per cycle at area A corresponding with the "natural combined governing characteristic" (see my AIEE paper 56–670 which appears in A.I.E.E. Transactions, part III, Power Apparatus and Systems, February 1957) of area A; a load change occurs in remote area B which reduces frequency to a steady-state value of 59.9 cycles. Governing action in local area A, when completed, increases the outgoing power by 10 megawatts to a total of 60 megawatts. Then, in Equation 1

$I_0$ is +50 megawatts
$I$ is +60 megawatts
$B$ is −100 megawatts/cycle
$F_0$ is 60 cycles/sec.
$F$ is 59.9 cycles/sec.

(1A)   Area requirement $= (50 - 60) - (-100)(60 - 59.9)$
$= -10 + 10 = 0$

Since the computed area requirement of local area A remains zero despite the change in outgoing power from area A toward remote area B resulting from the governing response in area A to the load change in area B, it has been shown by Equation 1A that compensation for governing action has been effected.

Fig. 4, with switch 12 closed to bypass the block 19, is illustrative of a prior computing circuit suited for determining area requirement as defined in Equation 1. The circuit components within rectangle 10 provide a voltage $E_I$ which varies in accordance with the sense and magnitude of deviations of tie-line power from $I_0$ (the scheduled interchange of power at normal frequency $F_0$). The circuit components within rectangle 11 provide a voltage $E_F$ which varies in accordance with the sense and magnitude of deviations of frequency from the normal frequency $F_0$ modified by the bias factor B of the area. Any difference in magnitude of these voltages ($E_I$, $E_F$), or of a current flow corresponding therewith, is a measure of the sense and magnitude of the deviation of the prevailing frequency/tieline condition from the schedule, line FL, of the area, and so is a measure of the area requirement as defined in Equation 1.

With the switches 13A, 13B in the full-line position shown, a current proportional to the difference in magnitudes of voltage $E_I$ and $E_F$ energizes a responsive device 14 suited to indicate or record the area requirement and/or to initiate action of a controller 15 for varying the generation of the area to reduce the area requirement to zero. With the switches 13A, 13B in dotted-line position, any difference in magnitude of voltages $E_I$, $E_F$ is measured by a self-balancing potentiometer 16 including a slidewire 17 adjusted by responsive device 14A. Concurrently with its rebalancing adjustment of slidewire 17, the responsive device 14A also initiates action of controller 15A for varying the generation of the area to reduce the area requirement to zero.

For a more complete description and illustration of arrangements suited to compute area requirement, as defined in Equation 1, or additionally including previously recognized factors such as time-error, and also suited to control the generation of an area to meet such requirement, reference may be had to my Patent No. 2,773,994 and to copending applications Serial Nos. 609,111, filed September 17, 1956, and 593,141, filed June 22, 1956, upon which have issued United States Letters Patent 2,866,102 and 2,831,125, respectively.

In such arrangements, as in the arrangements of Fig. 4 as thus far herein described with switch 12 closed, the area-requirement computer network of a particular area operating on a frequency-biased schedule includes means for compensating for the changes in steady-state tieline power-flow resulting from the governing action of that area due to change in load in another area. For graphical illustration of such compensation: assume, for example, that at time $T_0$ (Fig. 2A) the load LB of remote area B is rapidly increased from $L_0$ to a new value $L_1$. The increased load causes the system frequency F to fall as generally exemplified by curve F (Fig. 2B) from $F_0$ to a new value $F_1$. In response to the falling frequency, the governing action in both areas increases the inputs to the generators to check the dropping frequency. Because of such governing action in area A, in which there was no change in connected load, there is flow of additional power from area A to area B where the change in connected load occurred. This change in flow from $I_0$ to $I_1$ is generally indicated by curve $I_G$ of Fig. 2D. This changed power flow over the tieline, because of governing action in area A, is of proper magnitude for area A to meet its scheduled tie-line flow at system frequency $F_1$ (see point $F_1I_1$ of Fig. 3A), i.e., area requirement remains zero.

Thus, although the change in power flow resulting from governing action is included in the computation of area requirement for area A, it does not result in a demand for change in the generation in area A because the computation also includes the cancelling effect of $B(F_0-F)$, Equation 1, where F has the new value $F_1$.

In the foregoing, it was expressly assumed that the area A bias (B of Equation 1) had been set to match the natural combined governing characteristic of area A, thereby keeping the area requirement on zero despite governing response to load changes in remote area B. If the bias B is set to some value other than the natural combined governing characteristic, the area requirement as computed per Equation 1 will not be zero upon completion of the governing response in area A to load changes in area B. However, control action from area requirement at area A will then impose further change in generation in area A to reduce the area requirement to zero, thereby forcing the net generation response of area A to that demanded by the bias setting, as fully explained in the aforementioned AIEE paper 56-670.

In an area-requirement computing circuit as thus far described, regardless of whether the frequency bias-factor is set to match the area's natural combined characteristic or whether it is set to another value to impose a selected different characteristic on the area, there is achieved in the computing circuit, when area requirement is at zero, compensation for the new value of tie-line power flow ($I_1$) corresponding to the new steady-state frequency $F_1$ which results from the remote load change. In neither case, however, with the area-requirement computing circuits as thus far described, is there any compensation for the transient or oscillating components of tie-line power flow associated with changes in stored energy of the area and which are related to a changing frequency. The need for such compensation and methods and systems for achieving it are now discussed.

When there is an increase of load in a remote area, there is a transient component of power flow toward that area from other interconnected areas, which transient component has not previously been considered in area-requirement computing circuits, and which introduces inaccuracies into the area-requirement computation. Such inaccuracies, particularly in fast-acting controllers of generation, introduce unnecessary and undesirable generation changes in the areas in which the load change did not occur.

Figure 2A:
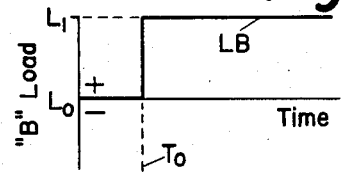
Figure 2B:
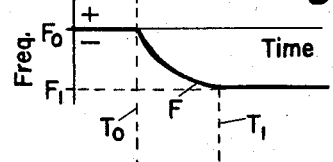

For example, when, as in Fig. 2A, there is a sudden increase of load in remote area B, the new load is initially supplied from the spinning or stored energy of the system as its moving masses decelerate. The initial accommodation of the new load from the spinning energy of the system is accompanied by a decrease in system frequency, as in Fig. 2B, from frequency $F_0$ to the new steady-state frequency $F_1$. The rate at which the frequency decreases is the system deceleration, drawn as curve M of Fig. 2C.

Both areas participate in the initial accommodation of the new load in remote area B with a corresponding decrease in their respective stored energies. That part of such initial accommodation which is contributed to area B by local area A appears as a component of tie-line power flow from area A to area B. Such transient component of the tie-line power flow is exemplified by curve $I_M$ of Fig. 2D.

This initial contribution from area A is derived from its spinning energy and may be termed its "inertia" response or contribution in the load change in area B. This inertia response is separate and distinct from the governing response and is a transient component $I_M$ of tie-line power flow from area A to area B. It precedes the governing response above discussed and which is exemplified by the change in curve $I_G$ of Fig. 2D from its original $I_0$ value. It will be understood that total tie-line power flow I is the algebraic sum of the $I_G$ and $I_M$ curves of Fig. 2D, it being recalled that $I_G$ is the algebraic sum of the normal frequency schedule and the governing response and that $I_M$ is the inertia response.

The inertia response component $I_M$ appears on the tie-line almost immediately and is of substantial magnitude before appreciable drop of frequency. An area-requirement computation base on Equation 1 would thus recognize the increase in tie-line power flow from area A to area B without a corresponding drop in frequency and would erroneously result in a minus area requirement for area A. Such erroneous area requirement would continue, with decreasing magnitude, so long as any part of the inertia-response component of the tie-line power flow from area A to area B persists.

To clarify how the error, due to the initial or inertia-response component arises, Equation 1 may be rewritten to substitute the sum of the two components $I_G$ and $I_M$ of the tie-line power flow for the total power flow I, yielding:

(2) Area requirement $=[I_0-(I_G+I_M)]-B(F_0-F)$

The frequency-bias term $[B(F_0-F)]$ compensates only for the governing response component included in $I_G$, leaving uncompensated the inertia-response component $I_M$ which therefore produces the aforesaid error in the computed area requirement.

Figure 2C:
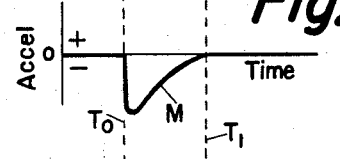
Figure 2D:
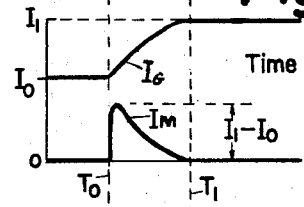
Figure 2E:
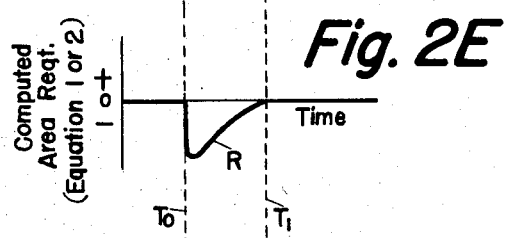

As can be seen from the $I_M$ curve of Fig. 2D, the inertia-response component starts and attains maximum magnitude upon occurrence of the remote load change at time $T_0$ and persists with decreasing magnitude until time $T_1$ when the frequency has attained its new steady-state value $F_1$. The corresponding error in the area-requirement computation is exemplified by the curve R of Fig. 2E.

Figure 3A:
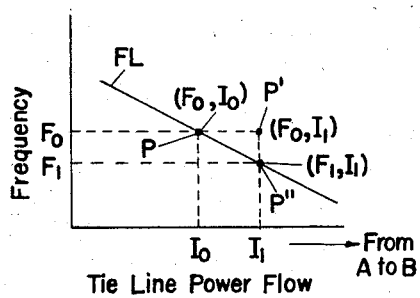

Referring to Fig. 3A, immediately before occurrence of the load change in remote area B, the frequency/tie-line conditions for local area A are represented by coordinates $F_0$, $I_0$ defining point P which falls on the schedule curve FL for area A. The area requirement is therefore zero. At time $T_0$, Fig. 2A, immediately after the remote load change, the frequency and tie-line conditions for area A are defined by coordinates $F_0$ and $I_1$, Fig. 3A (the latter representing, for purpose of discussion of this example, the peak magnitude of $I_0+I_M$ in the initial accommodation of the load change). These two coordinates $F_0$, $I_1$ define the point P', which does not fall on the schedule line FL but is above it. Thus, an area requirement computed by prior methods using Equation 1 or Equation 2 would yield a negative area requirement (Fig. 2E), whereas in fact the actual area requirement is zero because the load change occurred in a remote area.

As the inertia-response component $I_M$ decreases and the governing response component included in $I_G$ increases, the erroneous negative area requirement thus computed decreases until at time $T_1$ (Fig. 2E) it is zero. At that time, the steady-state frequency $F_1$ and steady-state power interchange $I_1$ define a zero area-requirement point P'' on schedule curve FL of Fig. 3A. However, during the period $T_0-T_1$, the area-requirement measurement is in error (Fig. 2E) and any control of generation initiated or based thereon is an error and undesirable.

Since the inertia-response component $I_M$ cannot be excluded from the measurement of total tie-line power flow I, compensation for $I_M$ is introduced into the computation of area requirement so that erroneous area-requirement computation is avoided while the inertia component power-flow $I_M$ persists. This is accomplished by introducing a new "acceleration bias" term into the area-requirement computation, as now discussed.

In general, the inertia-response flow is accompanied by a changing system speed, with a corresponding decrease or increase in stored energy. At any instant the stored energy of the rotating masses of an area is proportional to the square of their angular velocity. In an alternating-current system, the angular velocity of the spinning masses is related to the system frequency. Thus, (3) $$S_A = KF^2$$

where:

$S_A$ = stored energy in area A
$F$ = frequency
$K$ = proportionality factor dependent upon the characteristics of the rotating masses in area A When there is an increase in load in remote area B, the initial or inertia response tie-line power flow from local area A to area B (curve $I_M$ of Fig. 2D) is at the expense of stored energy in area A, and, ignoring tie-line losses, the magnitude of this transient component $I_M$ of tie-line power flow is determined by the rate of change of stored energy in area A. An expression for $I_M$ can thus be obtained by differentiating Equation 3 with respect to time.

(4) $$I_M = \frac{dS_A}{dt} = 2KF\frac{dF}{dt}$$

The term $$\frac{dF}{dt}$$

is the rate of change of system frequency and corresponds with acceleration or deceleration—i.e., positive or negative acceleration—of the system. Thus, Equation 4 may be rewritten as (5) $$I_M = 2KFM$$

where $M$ = acceleration.

$I_M$ is the parameter which adversely affects area-requirement computations as heretofore performed in accordance with Equations 1 or 2. To compensate for this parameter, a new term defined by $2KFM$ is introduced into the area-requirement computing circuit. The adverse effect on the area-requirement computation of the inertia response to a remote load change is thus eliminated.

The new equation for computing area requirement, including the new term, is (6) Area requirement =
$$[I_0-(I_G+I_M)]-B(F_0-F)-2KFM$$

where $2KF$ is the acceleration bias factor.

$I_0$ is the scheduled interchange for zero acceleration as well as for normal frequency. In accordance with the new concept, permissible deviations from normal interchange for a prevailing acceleration M at the prevailing frequency F are scheduled by presetting the magnitude of $2K$. As heretofore, permissible deviations from normal interchange can be scheduled for frequency deviations $(F_0-F)$ from normal by presetting the magnitude of B.

The new acceleration bias term $2KFM$ compensates for the $I_M$ component of the tie-line power flow. As before, the frequency-bias term $B(F_0-F)$ compensates for changes in $I_G$ component of the tie-line power flow. Thus, with the acceleration bias term included, the computed area-requirement remains at zero despite the transient power flow $I_M$ from local area A upon occurrence of a load change in remote area B.

Figure 3B:
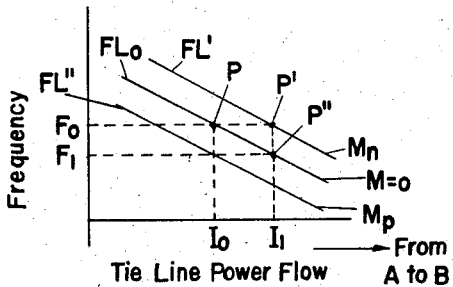

Equation 1 involving two variables, frequency and tie-line power flow, defines a single schedule curve (FL of Fig. 3A). New Equation 6 involving three variables (frequency, tie-line power flow and system acceleration) defines a schedule surface composed of an infinite number of frequency/tie-line schedule curves, each depending upon a magnitude of the system acceleration. In Fig. 3B, three such curves for three selected values of acceleration are shown as projected on a frequency/tie-line power flow plane. Schedule curve $FL_0$ is the special case applying when system acceleration M is zero and corresponds with curve FL of Fig. 3A. Curve FL' is exemplary of the scheduled frequency/tie-line power flow relationship when the system acceleration is negative ($M_n$) and FL'' is exemplary of such relationship when the system acceleration is positive ($M_p$). The extent of displacement of FL' and FL'' and their individual slopes with respect to $FL_0$ are defined by the term $2KFM$ of Equation 6.

Whenever a point defined by existing concurrent values of frequency, tie-line power flow and acceleration falls on the "schedule surface," the actual and the computed area requirement are both zero. When the point is not on such "schedule surface," there is an actual and computed area requirement, i.e., need for changed generation.

In discussion of Equation 2 and Fig. 3A, it was pointed out that upon occurrence of a remote load change (Fig. 2A) that although there was no true area requirement in local area A, nevertheless there was computed an erroneous area requirement for area A as exemplified in Fig. 3A by point P' not falling on the FL curve. Now considering the same case in connection with Equation 6 and Fig. 3B and assuming that acceleration $M_n$ (Fig. 3B) corresponds with the negative acceleration M (Fig. 2C) existent at time $T_0$ and that $I_1$ (Fig. 3B) is representative of the peak magnitude of $I_0+I_M$ (Fig. 2D), the point P' as defined by concurrent values, at time $T_0$, of frequency ($F_0$) and of tie-line power ($I_1$), falls on the FL curve (FL') corresponding with acceleration $M_n$ (Fig. 3B). Thus, for Equation 6 and Fig. 3B, in contrast with Equation 2 and Fig. 3A, the computed area requirement for area A at time $T_0$ is zero corresponding with the actual prevailing zero requirement for that area.

Figure 2F:
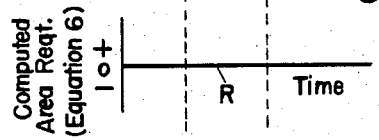

For the remainder of the time interval from $T_0$ to $T_1$ (Figs. 2A–2F) during which the transient inertia-response power flow $I_M$ from local area A persists with decreasing magnitude as shown in Fig. 2D, there is corresponding decrease in deceleration M as shown in Fig. 2C. Thus, in Fig. 3B all points defined by successive concurrent values of frequency and total tie-line power in time interval $T_0 - T_1$ fall respectively on FL schedule curves, each successively corresponding to the prevailing decreased magnitude of the deceleration until at time $T_1$ the prevailing frequency and tie-line power flow define point P" corresponding with the new steady-state frequency $F_1$, the new steady-state tie-line power flow $I_1$ and zero acceleration ($M=0$). Thus, throughout the interval $T_0 - T_1$, the computed area requirement, using Equation 6, correctly remains—as indicated in Fig. 2F—at zero. This is in contrast to the curve of Fig. 2E which shows—for computations based on Equations 1 or 2—the erroneous computed area requirement for that interval.

Reverting to Fig. 4, in the area requirement computing circuit as thus far explained (switch 12 closed), there is no compensation for the inertia power flow component ($I_M$) which results upon occurrence of a remote load change. Because such power flow is one of the components represented in voltage $E_I$, the resulting computation indicates a deviation of area requirement from zero, whereas in fact the true area requirement for the conditions being considered is zero.

To achieve the new results discussed in connection with Equation 6 and Fig. 3B, the computing circuit is modified to compensate for the effect in voltage $E_I$ of inertia power flow ($I_M$). In the block diagram of Fig. 4, this is accomplished (switch 12 open) by inclusion of means 19 for producing a voltage $E_3$ proportional to 2KFM. This This voltage in effect provides acceleration compensation exactly corresponding with this last term (2KFM) of Equation 6. There is thus achieved, in the new area requirement computation, exact compensation for the transient component of the tie-line power flow which derives from change in stored energy in the area in which the load change did not occur.

The acceleration compensation term (2KFM) of Equation 6 includes both frequency and acceleration factors. Since in general the percentage change in acceleration is much greater than the percentage change in frequency, it usually suffices, as in several of the specific arrangements later described, to consider the frequency factor (F) as constant at its normal value $F_0$, combining it with the term 2K, so that Equation 6 may be rewritten as (6A) Area requirement=
$$[I_0 - (I_G + I_M)] - B(F_0 - F) - B_m M$$

where $B_m$ is a composite acceleration bias factor equal to $2KF_0$

In computing circuits which are based on Equation 6A, voltage $E_3$ is proportional to the acceleration M, and specifically is equal to $B_m M$, as indicated as an alternative in block 19, Fig. 4.

Fig. 5 is a particular embodiment of the computer network of Fig. 4 in which the acceleration compensation term is equal to 2KFM as in Equation 6. The means 10 for producing a voltage $E_I$ representative of the difference between the scheduled normal interchange ($I_0$) and the actual interchange ($I = I_G + I_M$) is a bridge network comprising the slidewires 20, 21 and a suitable current supply source V. The slidewire 20 is manually set as by the dial 22 so that the relative position of this slidewire and its contact corresponds with the tie-line power ($I_0$) scheduled for the area for steady-state normal frequency $F_0$. This power flow will be to or from the area depending upon whether its schedule calls for buying or for selling power with respect to the other area or areas of the power distribution network. The slidewire 21 is adjusted relative to its contact by a wattmeter 23, or equivalent device, responsive to the actual power interchange ($I_G + I_M$) between the area and the remainder of the power distribution network. When the actual interchange is equal to the scheduled normal-frequency interchange set by dial 22, the bridge is in balance and the output voltage $E_I$ is zero. If the actual interchange is greater or less than such preset scheduled interchange, the bridge is unbalanced and its output voltage $E_I$ is of sense and magnitude corresponding with the deviation of tie-line power flow from such scheduled interchange.

The means 11 for producing a voltage $E_F$ proportional to the deviation of frequency from scheduled frequency $F_0$ is also a bridge network comprising slidewires 24 and 25 and a suitable current supply source V. The slidewire 25 is manually set as by dial 26 so the relative position of this slidewire and its contact corresponds with the scheduled normal frequency $F_0$. The slidewire 24 is adjusted relative to its contact by a frequency meter 27 of any suitable type including, for example, that of the type shown in Wunsch Patent No. 1,751,538. When the actual frequency (F) corresponds with the scheduled frequency $F_0$, the bridge 11 is in balance and the voltage $E_F$ is zero: when the actual frequency is above or below the scheduled frequency, the output voltage $E_F$ is of sense and magnitude corresponding with the frequency deviation from schedule. The frequency-bias factor B of Equation 6 may be manually adjusted in network 11 as by dial 28 of rheostat 29 to establish the slope of the frequency-biased power-interchange schedule $FL_0$ (Fig. 3B) of the area.

The means 19 for introducing the new inertia-response term (2KFM) into the computation of area requirement comprises the potentiometer network including slidewires 30, 31 and a suitable current supply source V. The position of slidewire 30 relative to its contact is changed with change of system frequency as by frequency-meter 27A. This frequency meter may be separate from frequency-meter 27 for slidewire 24 of network 11; alternatively, the slidewires 24 and 30 may be repeating slidewires, both actuated from a single frequency-meter such as shown, for example, in the aforesaid Wunsch patent. The position of slidewire 31 relative to its contact 33 may be varied by any suitable acceleration-metering means 32 directly or indirectly responsive to M, the rate of change of system frequency or more generally to the rate of change of the angular velocity of rotating masses of the area or system. The acceleration device 32 for positioning slidewire contact 33 may be of any suitable type including that shown in Fig. 10, later described.

The rheostat 36 in network 19 is set by knob 35 to correspond with factor 2K of Equation 6. The magnitude of the current traversing the acceleration slidewire 31 depends upon the setting of rheostat 36 and upon the automatic adjustment of frequency slidewire 30 and therefore is proportionate to 2KF, the acceleration bias-factor. At zero acceleration, the potential of contact 33 of acceleration slidewire 31 corresponds with that of the slidewire zero-tap 34 or equivalent reference point. Consequently, for zero acceleration, the output voltage $E_3$ of network 19 is zero regardless of the existing system frequency. For displacement of contact 33 from this zero position, the voltage $E_3$ is of sense corresponding with the sense of such displacement (i.e., positive or negative acceleration) and the magnitude of the voltage $E_3$ depends both upon the extent of that displacement and upon the magnitude of the current through slidewire 31. The displacement is proportional to the acceleration M. The current through slidewire 31 is proportional to frequency F times the acceleration-bias. With the acceleration-bias set by dial 35 to match the inertia-response characteristic (2K) of the area, the output voltage $E_3$ of network 19 then varies proportionally to 2KFM (Equation 6).

In the arrangement shown in Fig. 5, the algebraic sum of the output voltages of the networks 10, 11 and 19 is balanced against the voltage of the rebalancing network 16 which includes tapped slidewire 17 and a suitable current supply source V. When the resultant of the output voltages $E_I$, $E_F$ and $E_3$ is zero, which corresponds with zero area requirement, the computer network 9 is in balance with contact 37 of slidewire 17 of network 16 at the same potential as the zero-tap 38. If the computer network is not in balance, the contact 37 is moved relative to rebalancing slidewire 17 by the responsive device 14A to the position of balance corresponding with the existing resultant of voltages $E_I$, $E_F$ and $E_3$. Thus, the position of contact 37, as well as any element moved therewith, for example, the recorder pen 18 or the element 39 (Figs. 4, 5) of a controller 15A is a measure of the existing area requirement corresponding to Equation 6. This computation of area requirement includes, as above discussed, the automatic compensation for the effect of inertia-inspired transient power flow between the area and a second area in which a load change has occurred.

As above indicated in general discussion of Equations 6 and 6A, the percentage change of frequency is usually small compared with the percentage change of acceleration. Hence for many installations and where it is desired to compute the area requirement in accordance with Equation 6A, the network 19 of Fig. 5 may be simplified by omission of slidewire 30 so that, as shown in Fig. 6, the network 19A for introducing the voltage $E_3$ simply includes the tapped slidewire 31, whose contact 33 is adjusted relative thereto in accordance with acceleration M by a suitable acceleration-responsive device 32. The acceleration bias-factor $B_m$ is preset by adjustment of dial 35 of slidewire 36. Thus, the voltage $E_3$ is proportional to $B_mM$ (Equation 6A). In either of Figs. 5 or 6, the tapped slidewire 31 may, of course, be replaced by the equivalent arrangement of an untapped slidewire in shunt with a taped resistor or equivalent, providing a point of reference potential for zero acceleration.

In Fig. 5 as shown, or with network 19 replaced by network 19A, as in Fig. 6, or other arrangements later described, the supply sources V for the various subsidiary networks 10, 11, 16, 19 and 19A should be electrically isolated. This simply means that separate batteries or direct-current sources may be used for a computer circuit 9 of the direct-current type or separate transformer secondary windings for a computer circuit of the alternating-current type. The output from each of the sources V should be maintained constant at its selected value or all outputs may be permitted to vary with constant proportionality between them. The responsive device 14A should also, of course, be suited for alternating or direct current in dependence upon the type of supply source. The polarity or phasing of the several sources should be in accord with the requirement of Equations 6 and 6A.

Various other arrangements may be used to produce the inertia-response voltage $E_3$ for introduction into the area-requirement computer network. For example, in Fig. 7 a differentiating circuit comprising capacitor 40 and resistor 41 in series is connected across the output from the frequency slide-wire 30 so that during its adjustment by the frequency-meter 27, there appears across the resistor 41 a voltage corresponding in sense and magnitude with the rate of change of frequency $$\left(\frac{dF}{dt}\right)$$

as a measure of acceleration M. The acceleration bias $B_m$ is preset by dial 35 of resistor 41. Thus, the output voltage $E_3$ that appears between terminals 42 (D.C.) and 43 (D.C.) of network 19B is proportional to $B_mM$ of Equation 6A.

Figure 7:
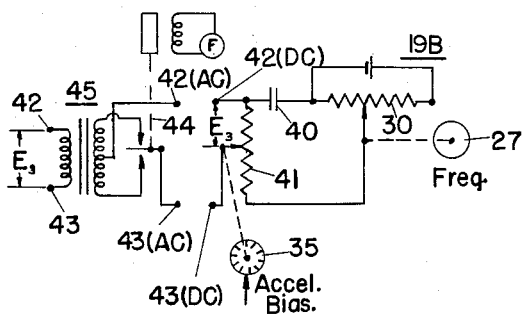

If the area-requirement computer network 9 is of the direct-current type, this output voltage of network 19B of Fig. 7 is applied directly to terminals 42 and 43 of the computer network of Fig. 5 in substitution for the output of network 19. If the computer network 9 is of the alternating-current type, the output voltage of network 19B (Fig. 7) is converted to an alternating-current voltage by synchronous converter 44 and is supplied to the terminals 42, 43 of the computer network 9 through transformer 45. This may be achieved by connecting the output terminals 42 (D.C.), 43 (D.C.) of network 19B to the input terminal 42 (A.C.), 43 (A.C.) of the synchronous converter.

Figure 8:
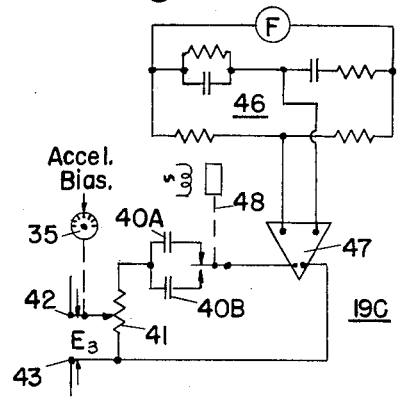

Another suitable arrangement 19C for producing a voltage $E_3$ corresponding in sense and magnitude with $B_mM$, representative of the rate of change of spinning energy of the system, is shown in Fig. 8. The network 46 is a Wien bridge which is excited at system frequency and therefore has an output which varies with change in system frequency. This alternating-current output as amplified by amplifier 47 and differentiated by the network comprising resistor 41, capacitors 40A, 40B and the synchronous converter 48 provides, at the network terminals 42, 43, an alternating voltage $E_3$ corresponding in sense and magnitude with the rate of change of the system frequency. As in the networks 19A, 19B previously discussed, the acceleration-bias factor $B_m$ is set by dial 35.

Figure 9:
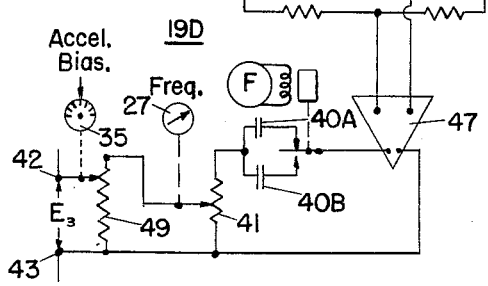

The arrangement 19D as shown in Fig. 9 is similar to that of Fig. 8 except that the contact of resistor 41 is adjusted by frequency-meter 27 and the acceleration bias is set by dial 35 coupled to the slidewire 49 so that the output voltage $E_3$ is proportional to the acceleration-bias term 2KFM (Equation 6).

An acceleration-metering arrangement suited to adjust the contact 33 of slidewire 31 of Fig. 5 or 6 in accordance with acceleration is shown in Fig. 10. The frequency-responsive device 27A adjusts slidewire 50 relative to its contact in accordance with changes in system frequency. The output of the slidewire is differentiated as by the RC network 51, 52 to produce across resistor 51 a voltage whose sense and magnitude corresponds with the direction and rate of change of system frequency. The resultant of this voltage and the output voltage of bridge network 53 actuates the responsive device 54 which adjusts the bridge slidewire 55 to effect balance of these voltages and concurrently correspondingly repositions the contact 33 of slidewire 31. Thus, the position of contact 33 corresponds with the existing acceleration M for inclusion in the computed area-requirement of compensation for transient power flows associated with changes in stored energy.

In all of the arrangements described, the inclusion of the inertia-response voltage $E_3$ compensates, in the computation of the area requirement of a local area, for the transient tie-line power flow component $I_M$ which results from inertia response to load changes in a remote area. It also compensates, in the area-requirement computation, for any oscillatory tie-line power flows resulting from the inherently elastic nature of a tie-line connection between two areas, frequently referred to as synchronizing power. Although two such areas are synchronized and have the same average frequency, during such oscillatory state between them, the stored energy of one area alternately increases and decreases while the stored energy of the other alternately decreases and increases. Such concurrent oscillations of stored energy in opposite senses would be accompanied by corresponding accelerations, in opposite senses, of the rotating masses of the two areas and by oscillatory tie-line power flows between them which do not correspond with actual load changes or generation requirements of either area. With the acceleration factor included in the computation of area requirement of each of the areas in accordance with Equation 6 or Equation 6A, there is compensation for such synchronizing power flows. There is thus avoided in each area the possibility of improper control action being demanded or initiated, as would be the case if the area-requirement computation for that area did not include the new additional compensating factor 2KFM or $B_mM$.

The improved area-requirement computing networks herein described may be used in automatic-generation control systems including those in which the area-requirement is allocated among stations and units of the area for sharing of regulation and economic loading of generators. As exemplary of such system, reference is made to my Patent 2,773,994 and to my copending applications Serial Nos. 593,141 and 609,111. In addition to its use in an area-requirement computing circuit, the acceleration factor may be introduced into networks for computation of the generation requirements of stations or units of an area, thereby compensating the station or unit requirement computation for their individual changes in stored energy. Such introduction of the acceleration-bias at station or unit level may be effected in manner identical to that shown in my copending application Serial No. 609,111 upon which has issued Letters Patent 2,866,102 for introduction of frequency-bias at those levels and may be in addition to the frequency-bias at those levels.

For brevity and clarity, there has been specifically discussed only a simple power-distribution network consisting of two generating areas with a single tie-line connection, but it will be understood that the invention is not limited thereto. When there is more than one tie-line to an area, the scheduled interchange is the scheduled net interchange over all of the tie-lines and the actual interchange is the actual net interchange over all of the tie-lines. Suitable totalizing wattmeter arrangements for varying the setting of slidewire 21 or equivalent in accordance with actual net interchange are known and need not here be discussed. Further, it will be understood that in both simple and complex power-distribution systems, all, or less than all, of the generating areas may be each provided with an area-requirement computer network of the new type herein described and claimed for indicating, recording or controlling the requirement of that area with automatic correction in the computation for power interchanges related to acceleration and deceleration of the spinning masses of the area.

What is claimed is:

1. In an electrical power distribution system comprising two or more interconnected generating sources operating under a power interchange schedule, an arrangement for determining the generation change required of one of said sources to maintain its schedule comprising means for producing first and second effects respectively corresponding with the scheduled normal interchange of power and the actual interchange of power, means for producing a third effect varying as a function of the acceleration of the spinning masses associated with said one of the sources, and means for combining said effects in production of a resultant which is a continuous direct measure of the generation change required of said one of the sources, which measure is compensated for that component of said actual interchange of power which is related to the stored energy change of said spinning masses.

2. An arrangement as in claim 1 additionally including exhibiting means responsive to said resultant for exhibition of the generation change required of said one of said sources to maintain its schedule, which exhibited generation change is compensated for said component of the actual interchange of power.

3. An arrangement as in claim 1 additionally including control means responsive to said resultant for controlling the generation of said one of said sources to maintain its schedule with avoidance of control action resulting from change in stored energy of the spinning masses due to change in load to be absorbed by other of said sources under the power interchange schedule.

4. In an electrical power distribution system comprising two or more interconnected generating sources operating under a power interchange schedule, an arrangement for determining the generation change required of one of said sources to maintain its schedule comprising means for producing first and second effects respectively corresponding with the scheduled normal interchange of power and the actual interchange of power, means for producing a third effect varying as a function of the acceleration of the spinning masses associated with said one of the sources, and balanceable means for opposing the algebraic summation of said effects adjustable in sense and extent to obtain zero resultant, the sense and extent of adjustment of said means being a continuous direct measure of the change in generation required of said one of said sources to satisfy its power interchange schedule, which measure is compensated for that component of said actual interchange of power which is related to the stored energy change of said spinning masses.

5. An arrangement as in claim 4 additionally including exhibiting means adjusted concurrently with adjustment of said balanceable means continuously to exhibit the generation change required of said one of said sources to maintain its schedule, which exhibited generation change is compensated for said component of the actual interchange of power.

6. An arrangement as in claim 4 additionally including control means responsive to said adjustment of the balanceable means for controlling the generation of said one of said sources to maintain its schedule with avoidance of control action resulting from change in stored energy of the spinning masses due to change in load to be absorbed by other of said sources under the power interchange schedule.

7. In an electrical power distribution system comprising two or more interconnected generating sources operating under a power interchange schedule, an arrangement for determining the generation change required of one of said sources to maintain its schedule comprising means for producing first and second effects respectively corresponding with the scheduled normal interchange of power and the actual interchange of power, means for producing a third effect varying proportionally to the product of the acceleration of the spinning masses associated with said one of the sources times the existing system frequency, and means for combining said effects in production of a resultant which is a measure of the generation change required of said one of the sources, which measure is compensated for that component of said actual interchange of power which is related to the stored energy change of said spinning masses.

8. An arrangement as in claim 7 additionally including exhibiting means responsive to said resultant for exhibition of the generation change required of said one of said sources to maintain its schedule, which exhibited generation change is compensated for said component of the actual interchange of power.

9. An arrangement as in claim 7 additionally including control means responsive to said resultant for controlling the generation of said one of said sources to maintain its schedule with avoidance of control action resulting from said component of the actual interchange of power due to change in load to be absorbed by other of said sources under the power interchange schedule.

10. An arrangement as in claim 7 in which the first-named means includes an element manually preset in accordance with the scheduled normal interchange of power and an element adjustable by a device responsive to the actual interchange of power, and in which the second-named means includes an element adjustable by a device responsive to frequency, an element adjusted by a device responsive to the acceleration of said spinning masses, and an element manually preset for a proportionality factor.

11. An arrangement for determining the generation change required of a generating source connected to a distribution system and required to maintain an acceleration-biased schedule of flow of power to said system comprising means for producing an effect related to the actual flow of power from said source to said system, means for producing an effect related to the normal scheduled flow of power from said source to said system, means for producing an effect related to the product of the acceleration of spinning masses associated with said source, times an acceleration bias-factor assigned to said source, and means responsive to the algebraic summation of said effects, which summation is representative of a continuous direct measure of the generation change required of said source including compensation for the component of actual power flow related to said acceleration of spinning masses associated with said source.

12. An arrangement as in claim 11 additionally including exhibiting means responsive to said summation for exhibition of the generation change required of said source to maintain its schedule, which exhibited generation change is compensated for said component of the actual power flow.

13. An arrangement as in claim 11 additionally including control means responsive to said summation for controlling the generation of said source to maintain its schedule with avoidance of control action resulting from said component of actual power flow due to change in load to be absorbed under the power interchange schedule by said connected distribution system.

14. In a power distribution system comprising two or more interconnected generating areas, a system for determining the generation change required of an area to maintain a scheduled interchange of power with one or more other areas of said power distribution system, which comprises means producing a first effect varying in accordance with a deviation of the actual interchange of power from the scheduled normal interchange of power, means producing a second effect varying in accordance with the concurrent rate of change of the stored energy of the area, and means for combining said effects to produce a resultant continuously and directly corresponding with the generation change required of the area to maintain said schedule, said resultant thus being compensated for the component of power interchange related to said rate of change of stored energy.

15. An arrangement as in claim 14 additionally including exhibiting means responsive to said resultant for exhibition of the generation change required of the area to maintain its interchange schedule, which exhibited generation change is compensated for said component of the actual interchange.

16. An arrangement as in claim 14 additionally including control means responsive to said resultant for controlling generation within the area to maintain the area interchange schedule with avoidance of control action resulting from said component of power interchange due to change in load in a remote area.

17. In a power-distribution system comprising two or more interconnected generating areas, a system for determining the generation change required of an area to maintain a scheduled interchange of power with one or more other areas of said power-distribution system, which comprises means producing a first effect varying in accordance with a deviation of the actual interchange of power from the sceduled normal interchange of power, means producing a second effect varying in accordance with the concurrent rate of change of the stored energy of the area, and balanceable means for opposing the algebraic summation of said effects adjustable in sense and extent to obtain zero resultant, the sense and extent of adjustment of said balanceable means being a continuous direct measure of the change in generation required of said area to satisfy its power interchange schedule, which measure is compensated for that component of said actual interchange of power which is related to the stored energy of said area.

18. An arrangement as in claim 17 additionally including exhibiting means adjusted concurrently with adjustment of said balanceable means continuously to exhibit the generation change required of said one of said areas to maintain its schedule, which exhibited generation change is compensated for said component of the actual interchange of power.

19. An arrangement as in claim 17 additionally including control means responsive to said adjustment of the balanceable means for controlling the generation of said one of said areas to maintain its schedule with avoidance of control action resulting from said component of actual interchange of power due to change in load in a remote area.

20. In an electrical power distribution system comprising two or more generating sources operating under a frequency-biased, acceleration-biased power-interchange schedule, an arrangement for determining the generation change required of a source to maintain its schedule comprising means for producing a first effect corresponding with the scheduled interchange of power at normal system frequency and zero acceleration, means for producing a second effect corresponding with the actual interchange of power, said second effect having components respectively corresponding with the governing contribution of said source to remote load changes and the stored-energy contribution of spinning masses of said source, means for producing a third effect corresponding with the product of deviation from said normal frequency times a frequency-bias factor assigned to said source, means for producing a fourth effect corresponding with the product of the acceleration of spinning masses of said source times an acceleration-bias factor assigned to said source, and means for combining said effects in production of a resultant effect which is a continuous direct measure of the generation change required of the source to maintain its schedule, which measure is compensated for the power interchange components due to its governing response to remote load changes and to inertia response of its spinning masses.

21. An arrangement as in claim 20 additionally including exhibiting means responsive to said resultant effect for exhibition of the generation change required of said source, which exhibited generation change is compensated for said governing and stored-energy components of the actual interchange.

22. An arrangement as in claim 20 additionally including control means responsive to said resultant effect for controlling the generation of said source to maintain its schedule with avoidance of control action resulting from said power interchange components due to remote load changes.

23. An arrangement as in claim 20 in which the assigned acceleration bias-factor is produced by means responsive to the existing system frequency, whereby said fourth effect is proportional to the product of existing system frequency times the acceleration of said spinning masses.

24. An arrangement as in claim 20 in which the assigned acceleration bias-factor is of fixed value corresponding with normal system frequency, whereby said fourth effect is proportional to the normal system frequency times the acceleration of said spinning masses.

25. An arrangement as in claim 20 in which the first-named means includes an element manually preset in accordance with the scheduled normal interchange of power, in which the second-named means includes an element adjustable by a device responsive to the actual interchange of power, in which the third-named means includes elements manually preset in accordance with frequency-bias and normal system frequency and an element adjustable by a device responsive to system frequency, and in which the fourth-named means includes a manually preset acceleration-bias element and an element automatically adjusted in accordance with the acceleration of said spinning masses.

26. An arrangement as in claim 20 in which the first-named means includes an element manually preset in accordance with the scheduled normal interchange of power, in which the second-named means includes an element adjustable by a device responsive to the actual interchange of power, in which the third-named means includes elements manually preset in accordance with frequency-bias and normal system frequency and an element adjustable by a device responsive to system frequency, and in which the fourth-named means includes an element automatically adjusted in accordance with the acceleration of said spinning masses, an element automatically adjusted in accordance with the existing system frequency, and an element for manually presetting a proportionality factor.

27. An arrangement for determining the generation requirement of a generating source connected for scheduled interchange of power with a common distribution system over one or more tie-lines subject to synchronizing power flows comprising means for producing an effect related to the actual interchange of power of said source with said system, said actual interchange including said synchronizing power flows, means for producing a second effect related to the scheduled normal interchange of power of said source with said system, means for producing a third effect related to the product of the source acceleration times an acceleration bias-factor assigned to said source, and means for combining said effects as a continuous direct measure of the generation requirement of said source without error due to the presence of synchronizing power flows in the actual interchange.

28. An arrangement as in claim 27 in which the assigned acceleration bias-factor is produced by means responsive to the existing system frequency, whereby said third effect is proportional to the product of existing system frequency times the acceleration of spinning masses associated with the source.

29. An arrangement as in claim 27 in which the assigned acceleration bias-factor is produced by means preset to provide an acceleration-bias factor value corresponding with normal system frequency, whereby said third effect is proportional to the normal system frequency times the acceleration of spinning masses associated with the source.

30. A system for control of generation in an area interconnected to a power-distribution system by at least one tie-line subject to synchronizing power flows and power flows derived from remote load changes and operating on a frequency-biased, acceleration-biased tie-line interchange schedule, comprising means for producing effects corresponding with scheduled normal tie-line interchange, actual tie-line interchange, frequency-deviation, frequency-bias, area-acceleration and acceleration-bias, and means for combining said effects to produce a resultant effect continuously and directly indicative of the change in area generation required to satisfy its tie-line interchange schedule.

31. A system as in claim 30 including means for controlling generation within the area to reduce said resultant effect to zero with avoidance of control action resulting from said synchronizing power flows and power flows derived from remote load changes.

32. A system as in claim 30 in which said acceleration-bias includes a factor produced by means responsive to the existing frequency.

33. A system as in claim 30 in which the means for producing said acceleration-bias effect includes means for producing a factor effect of fixed value corresponding with normal system frequency.

34. A system for control of generation in an area interconnected to a power-distribution system by at least one tieline subject to synchronizing power flows and power flows derived from remote load changes and operating on a frequency-biased, acceleration-biased tieline interchange schedule, comprising means for producing effects corresponding with scheduled normal tieline interchange, actual tie-line interchange, frequency-deviation, frequency-bias, area-acceleration and acceleration-bias, and balanceable means for opposing the algebraic summation of said effects adjustable in sense and extent to obtain zero resultant, the sense and extent of adjustment of said balanceable means being a continuous direct measure of the change in generation required of said area to satisfy its power interchange schedule, which measure is thus compensated for said power flows.

35. A system as in claim 34 which additionally includes exhibiting means adjusted concurrently with adjustment of said balanceable means continuously to exhibit the generation change required of said area to maintain its schedule, which exhibited generation change is compensated for said power flows.

36. A system as in claim 34 which additionally includes control means responsive to said adjustment of said balanceable means for controlling the generation of said area with avoidance of control action resulting from said synchronizing power flows and power flows derived from remote load changes.

37. A system as in claim 34 in which said acceleration-bias includes a factor produced by means responsive to the existing frequency.

38. A system as in claim 34 in which the means for producing said acceleration-bias effect includes means for producing a factor effect of fixed value corresponding with normal system frequency.

39. In a system for control of generation in an area interconnected by at least one tie-line to a power-distribution system, operating under an acceleration-biased tie-line interchange schedule, and in which the area-requirement is allocated among generators of the area for sharing regulation and for economic loading, means for producing effects corresponding with scheduled normal tie-line interchange, actual tie-line interchange, area-acceleration and acceleration-bias, and means including control means responsive to the resultant of said effects for adjusting the outputs of said generators to reduce said resultant to zero with avoidance of undesired control action resulting from power flows due to acceleration of spinning masses of the area.

40. In a system for control of generation in an area interconnected by at least one tie-line to a power-distribution system, operating under an acceleration-biased tie-line interchange schedule, and in which the area-requirement is allocated among generators of the area for sharing regulation and for economic loading, means for producing effects corresponding with scheduled normal tie-line interchange, actual tie-line interchange, area-acceleration and acceleration-bias, balanceable means for opposing the resultant of said effects adjustable in sense and extent to produce zero resultant, and control means responsive to adjustment of said balanceable means for adjusting the outputs of said generators with avoidance of undesired control action resulting from power flows due to acceleration of spinning masses of the area.

41. In a system for control of generation in an area interconnected by at least one tie-line to a power-distribution system, operating under a frequency-biased, acceleration-biased tie-line interchange schedule, and in which area-requirement is allocated among generators of the area for sharing regulation and for economic loading, means for producing effects corresponding with scheduled normal tie-line interchange, actual tie-line interchange, frequency-deviation, frequency-bias, area-acceleration and acceleration-bias, balanceable means for opposing the resultant of said effects adjustable in sense and extent to produce zero resultant, and control means responsive to adjustment of said balanceable means for adjusting the outputs of said generators with avoidance of undesired control action resulting from power flows due to acceleration of spinning masses of the area.

42. A system for control of generation in two or more areas interconnected to a power-distribution system by at least one tie-line subject to synchronizing power flows coincident with acceleration of the spinning masses in one area and deceleration of the spinning masses of another area and each operating on a frequency-biased, acceleration-biased tie-line interchange schedule comprising for each of at least two areas means for producing individual area effects corresponding with the scheduled normal tie-line interchange of the area, the actual tie-line interchange of the area, the frequency-deviation within the area, the frequency-bias assigned to the area, the acceleration of spinning masses of the area, and the acceleration-bias assigned to the area, and means individual to each of said areas for combining the corresponding individual area effects to produce a resultant effect which is a continuous and direct measure of the change in generation required of that area to satisfy its tie-line interchange schedule, which measure is compensated in sense and extent for any synchronizing power flow to or from that area.

43. A system for control of generation in two or more areas interconnected to a power-distribution system by at least one tie-line subject to synchronizing power flows coincident with acceleration of the spinning masses in one area and deceleration of the spinning masses of another area and each operating on a frequency-biased, acceleration-biased tie-line interchange schedule comprising for each of at least two areas means for producing individual area effects corresponding with the scheduled normal tie-line interchange of the area, the actual tie-line interchange of the area, the frequency-deviation within the area, the frequency-bias assigned to the area, the acceleration of spinning masses of the area, and the acceleration-bias assigned to the area, and balanceable means individual to each of said areas for opposing the algebraic summation of the corresponding area effects adjustable in sense and extent to produce zero resultant, the sense and extent of adjustment of said balanceable means being a continuous direct measure of the change in generation required of that area to satisfy its tie-line interchange schedule, which measure is compensated in sense and extent for any synchronizing power flow to or from that area.

44. An arrangement as in claim 43 additionally including a plurality of control means, one for each of said at least two areas, each of said control means being responsive to the adjustment of the corresponding balanceable means, and said plurality of control means jointly effecting concurrent control of the generation of corresponding areas to maintain the respective area schedules with avoidance of control action resulting from said synchronizing power flows.

45. In a system for control of generation of areas interconnected by at least one tie-line, subject to synchronizing power flows coincident with acceleration of the spinning masses in one area and deceleration of the spinning masses in another area, each of said areas operating under a frequency-biased, acceleration-biased tie-line interchange schedule with allocation of area-requirement among generators of the area for sharing regulation and for economic loading, at least two of said areas having means for producing individual area effects corresponding with normal tie-line interchange of the area, the actual interchange of the area, the frequency-deviation within the area, the frequency-bias assigned to the area, the acceleration of spinning masses of the area and the acceleration-bias assigned to the area, balanceable means individual to each of said at least two areas for opposing the algebraic summation of the corresponding area effects adjustable in sense and extent to produce zero resultant, the sense and extent of adjustment of said balanceable means being a continuous direct measure of the change in generation required of that area to satisfy its tie-line interchange schedule, which measure is compensated in sense and extent for any synchronizing power flow to or from that area, a plurality of control means, one for each of said at least two areas, each of said control means being responsive to the adjustment of the corresponding balanceable means, and said plurality of control means jointly effecting concurrent control of the generation of corresponding areas to maintain the respective area schedules and concurrently to maintain sharing of regulation among, and economic loading of, the generators of each area with avoidance of control action resulting from said synchronizing power flows.

46. In a power-distribution system comprising two or more interconnected generating sources, operating under a power interchange schedule, an arrangement for determining the generation change required of a source to maintain its schedule comprising means for producing a first effect varying in accordance with a deviation of the actual interchange of power from the scheduled normal interchange of power, means for producing a second effect varying in accordance with the concurrent rate of change of the stored energy of the spinning masses associated with said source, and means for combining said effects to produce a resultant corresponding continuously and directly with the generation change required of said source to maintain its schedule, said resultant thus being compensated for the component of power interchange related to said rate of change of stored energy.

47. In a power-distribution system comprising two or more interconnected generating areas operating under a frequency-biased, acceleration-biased, power-interchange schedule, an arrangement for determining the generation required of an area to maintain its schedule comprising means for producing an effect varying in accordance with deviations of the actual interchange of power from the scheduled normal interchange of power, means for producing an effect varying in accordance with deviations of the actual frequency from the normal frequency, means for producing an effect varying in accordance with the rate of change of frequency, and means for combining said effects to produce a resultant corresponding continuously and directly with the generation requirement of the area corrected for presence of power interchange components due to its governing response to remote load changes and to inertia response of its spinning masses.

48. In a power-distribution system comprising two or more interconnected generating areas operating under a frequency-biased, acceleration-biased, power-interchange schedule, an arrangement for determining the generation change required of an area to maintain its schedule comprising means for producing an effect varying in accordance with deviations of the actual interchange of power from the scheduled normal interchange of power, means for producing an effect varying in accordance with deviations of the actual frequency from the normal frequency, means for producing an effect varying in accordance with the product of system frequency times the rate of change thereof, and means for combining said effects to produce a resultant corresponding continuously and directly with the generation requirement of the area corrected for the steady-state power interchange component due to its governing responses to remote load changes and for the transient power interchange component related to changes in stored energy of its spinning masses.

49. In a power-distribution system comprising two or more interconnected generating areas operating under a frequency-biased, acceleration-biased, power-interchange schedule, an arrangement for determining the generation required of an area to maintain its schedule comprising means for producing an effect varying in accordance with deviations of the actual interchange of power from the scheduled normal interchange of power, means for producing an effect varying in accordance with deviations of the actual frequency from the normal frequency, means for producing an effect varying in accordance with the product of the acceleration of spinning masses of the area times a preset constant, means for combining said effects to produce a summation effect, and means for varying a balancing effect opposed to said summation effect to produce a zero resultant, the sense and extent of said balancing effect then corresponding with the generation requirement of the area corrected for deviations from scheduled normal interchange related to governing responses of the area to remote load change and to changes in stored energy of spinning masses of the area.

References Cited in the file of this patent

UNITED STATES PATENTS

| | | |
|---|---|---|
| 1,751,538 | Wunsch | Mar. 25, 1930 |
| 2,540,798 | Stearn | Feb. 6, 1951 |
| 2,836,731 | Miller | May 27, 1958 |

FOREIGN PATENTS

| | | |
|---|---|---|
| 503,793 | Italy | Dec. 7, 1954 |

OTHER REFERENCES

Trans. of the AIEE, vol. 71, part I (Hornfeck), July 1952, pages 183–193.

UNITED STATES PATENT OFFICE

CERTIFICATE OF CORRECTION

Patent No. 2,923,832  February 2, 1960

Nathan Cohn

It is hereby certified that error appears in the printed specification of the above numbered patent requiring correction and that the said Letters Patent should read as corrected below.

Column 2, line 33, for "percentabe" read -- percentage --; column 4, line 18, second line of the footnote, for "stop" read -- slope --; column 6, line 50, for "base" read -- based --; column 9, line 36, strike out "This"; column 11, line 16, after "the", first occurrence, insert -- new --; column 15, line 58, for "sceduled" read -- scheduled --;

Signed and sealed this 27th day of September 1960.

(SEAL)
Attest:
KARL H. AXLINE
Attesting Officer

ROBERT C. WATSON
Commissioner of Patents